(12) United States Patent
Walsh et al.

(10) Patent No.: US 11,440,256 B2
(45) Date of Patent: Sep. 13, 2022

(54) STACKABLE BUILD PLATES FOR ADDITIVE MANUFACTURING POWDER HANDLING

(71) Applicant: Howmedica Osteonics Corp., Mahwah, NJ (US)

(72) Inventors: Gearoid Walsh, Ennis (IE); Eoin Kendall, Limerick (IE)

(73) Assignee: Howmedica Osteonics Corp., Mahwah, NJ (US)

( * ) Notice: Subject to any disclaimer, the term of this patent is extended or adjusted under 35 U.S.C. 154(b) by 96 days.

(21) Appl. No.: 16/440,320

(22) Filed: Jun. 13, 2019

(65) Prior Publication Data

US 2019/0381731 A1 Dec. 19, 2019

Related U.S. Application Data

(60) Provisional application No. 62/685,609, filed on Jun. 15, 2018.

(51) Int. Cl.

| | |
|---|---|
| *B29C 64/245* | (2017.01) |
| *B22F 12/33* | (2021.01) |
| *B33Y 30/00* | (2015.01) |
| *B29C 64/153* | (2017.01) |
| *B33Y 10/00* | (2015.01) |

(52) U.S. Cl.
CPC ............ *B29C 64/245* (2017.08); *B22F 12/33* (2021.01); *B29C 64/153* (2017.08); *B33Y 10/00* (2014.12); *B33Y 30/00* (2014.12)

(58) Field of Classification Search
CPC ... B29C 64/245; B29C 64/153; B29C 64/176; B22F 12/33; B22F 10/20; B22F 12/00; B33Y 10/00; B33Y 30/00; Y02P 10/25
See application file for complete search history.

(56) References Cited

U.S. PATENT DOCUMENTS

| | | | |
|---|---|---|---|
| 8,021,138 | B2 | 9/2011 | Green |
| 8,668,859 | B2 | 3/2014 | Pettis |
| 8,753,105 | B2 | 6/2014 | Scott |
| 8,903,533 | B2 | 12/2014 | Eggers et al. |

(Continued)

FOREIGN PATENT DOCUMENTS

| | | |
|---|---|---|
| CN | 105921745 A | 9/2016 |
| CN | 106032062 A | 10/2016 |

(Continued)

OTHER PUBLICATIONS

European Search Report including Written Opinion for Application No. EP19180314.7, dated Aug. 5, 2019, pp. 1-7.

*Primary Examiner* — Rebecca Janssen
(74) *Attorney, Agent, or Firm* — Lerner, David, Littenberg, Krumholz & Mentlik, LLP

(57) ABSTRACT

A three-dimensional printing apparatus includes a base, a first build plate, and a second build plate. The base includes a build platform. The first build plate is attached to the base and is movable in vertical directions to a position spaced vertically from the build platform. The second build plate is supported by the first build plate such that the second build plate is spaced vertically from the first build plate. A plurality of objects is fabricated by the apparatus. A first object is fabricated on the first build plate. The first build plate is moved vertically. A second object is fabricated on the second build plate.

22 Claims, 5 Drawing Sheets

(56) References Cited

U.S. PATENT DOCUMENTS

| | | |
|---|---|---|
| 8,994,592 B2 | 3/2015 | Scott et al. |
| 9,517,592 B2 | 12/2016 | Yoo et al. |
| 9,597,730 B2 | 3/2017 | Mironets et al. |
| 2003/0173695 A1 | 9/2003 | Monkhouse et al. |
| 2011/0241947 A1 | 10/2011 | Scott et al. |
| 2013/0244040 A1 | 9/2013 | Oshima |
| 2013/0316081 A1 | 11/2013 | Kovalcik et al. |
| 2014/0065194 A1 | 3/2014 | Yoo et al. |
| 2014/0319735 A1 | 10/2014 | El-Siblani et al. |
| 2015/0072293 A1 | 3/2015 | DeSimone et al. |
| 2015/0097315 A1 | 4/2015 | DeSimone et al. |
| 2015/0097316 A1 | 4/2015 | DeSimone et al. |
| 2015/0102532 A1 | 4/2015 | DeSimone et al. |
| 2015/0165690 A1 | 6/2015 | Tow |
| 2015/0183166 A1 | 7/2015 | Yoo et al. |
| 2015/0321427 A1 | 11/2015 | Gunnarsson et al. |
| 2016/0046072 A1 | 2/2016 | Rolland et al. |
| 2016/0046075 A1 | 2/2016 | DeSimone et al. |
| 2016/0059484 A1 | 3/2016 | DeSimone et al. |
| 2016/0059486 A1 | 3/2016 | DeSimone et al. |
| 2016/0059487 A1 | 3/2016 | DeSimone et al. |
| 2016/0067740 A1 | 3/2016 | Voris et al. |
| 2016/0096326 A1 | 4/2016 | Naware |
| 2016/0096327 A1 | 4/2016 | Fry et al. |
| 2016/0136887 A1 | 5/2016 | Guillemette et al. |
| 2016/0136889 A1 | 5/2016 | Rolland et al. |
| 2016/0137838 A1 | 5/2016 | Rolland et al. |
| 2016/0137839 A1 | 5/2016 | Rolland et al. |
| 2016/0144428 A1 | 5/2016 | Mironets et al. |
| 2016/0160077 A1 | 6/2016 | Rolland et al. |
| 2016/0176118 A1 | 6/2016 | Reese et al. |
| 2016/0193786 A1 | 7/2016 | Moore et al. |
| 2016/0193787 A1 | 7/2016 | Yoo et al. |
| 2016/0200052 A1 | 7/2016 | Moore et al. |
| 2016/0200084 A1 | 7/2016 | Hays et al. |
| 2016/0207265 A1 | 7/2016 | Yoo et al. |
| 2016/0271878 A1 | 9/2016 | Nuechterlein et al. |
| 2016/0297104 A1 | 10/2016 | Guillemette et al. |
| 2016/0303793 A1 | 10/2016 | Ermoshkin et al. |
| 2016/0311158 A1 | 10/2016 | DeSimone et al. |
| 2016/0318257 A1 | 11/2016 | Brooks et al. |
| 2016/0325493 A1 | 11/2016 | DeSimone et al. |
| 2016/0332387 A1 | 11/2016 | Jondal et al. |
| 2016/0369096 A1 | 12/2016 | Rolland et al. |
| 2017/0001374 A1 | 1/2017 | Graham et al. |
| 2017/0028651 A1 | 2/2017 | Versluys et al. |
| 2017/0036400 A1 | 2/2017 | Loeffler et al. |
| 2017/0036404 A1 | 2/2017 | Rengers et al. |
| 2017/0050379 A1 | 2/2017 | Houben et al. |
| 2017/0069817 A1 | 3/2017 | Cauchon et al. |
| 2017/0100885 A1 | 4/2017 | DeSimone et al. |
| 2017/0113415 A1 | 4/2017 | DeSimone et al. |
| 2017/0113416 A1 | 4/2017 | DeSimone et al. |
| 2017/0120332 A1 | 5/2017 | DeMuth et al. |
| 2017/0151718 A1 | 6/2017 | Rolland et al. |
| 2017/0151723 A1 | 6/2017 | Yoo et al. |
| 2017/0173871 A1 | 6/2017 | Ermoshkin et al. |
| 2017/0173872 A1 | 6/2017 | McCall et al. |
| 2017/0173880 A1 | 6/2017 | Desimone et al. |
| 2017/0210077 A1 | 7/2017 | Ermoshkin et al. |
| 2017/0217106 A1 | 8/2017 | Reese et al. |
| 2017/0239725 A1* | 8/2017 | Ufton .................. B22F 12/00 |
| 2017/0239726 A1 | 8/2017 | Palumbo et al. |
| 2017/0239887 A1 | 8/2017 | Rolland et al. |
| 2017/0252812 A1 | 9/2017 | Mykulowycz et al. |
| 2017/0252813 A1 | 9/2017 | Myerberg et al. |
| 2017/0252814 A1 | 9/2017 | Myerberg et al. |
| 2017/0252815 A1 | 9/2017 | Fontana et al. |
| 2017/0252816 A1 | 9/2017 | Shim et al. |
| 2017/0252817 A1 | 9/2017 | Mykulowycz et al. |
| 2017/0252818 A1 | 9/2017 | Gibson et al. |
| 2017/0252819 A1 | 9/2017 | Gibson et al. |
| 2017/0252820 A1 | 9/2017 | Myerberg et al. |
| 2017/0252967 A9 | 9/2017 | Guillemette et al. |
| 2017/0259502 A1 | 9/2017 | Chapiro et al. |
| 2017/0266890 A1 | 9/2017 | Volk |
| 2017/0291804 A1 | 10/2017 | Craft et al. |
| 2017/0297097 A1 | 10/2017 | Gibson et al. |
| 2017/0297098 A1 | 10/2017 | Myerberg et al. |
| 2017/0297099 A1 | 10/2017 | Gibson et al. |
| 2017/0297100 A1 | 10/2017 | Gibson et al. |
| 2017/0297102 A1 | 10/2017 | Chin et al. |
| 2017/0297103 A1 | 10/2017 | Myerberg et al. |
| 2017/0297104 A1 | 10/2017 | Gibson et al. |
| 2017/0297106 A1 | 10/2017 | Myerberg et al. |
| 2017/0297111 A1 | 10/2017 | Myerberg et al. |
| 2017/0326642 A1 | 11/2017 | Shea et al. |
| 2017/0326643 A1 | 11/2017 | Barr |
| 2017/0333994 A1 | 11/2017 | Schmitt et al. |
| 2017/0355132 A1 | 12/2017 | Moore |
| 2017/0368759 A1 | 12/2017 | Penny et al. |
| 2018/0001552 A1 | 1/2018 | Dachs, II et al. |
| 2018/0009162 A1 | 1/2018 | Moore |
| 2018/0015662 A1 | 1/2018 | Ermoshkin et al. |
| 2018/0015669 A1 | 1/2018 | Moore et al. |
| 2018/0022034 A1 | 1/2018 | Sutter et al. |
| 2018/0022044 A1 | 1/2018 | Dulkiewicz et al. |
| 2018/0222115 A1 | 8/2018 | Watanabe et al. |
| 2018/0345371 A1* | 12/2018 | Mamrak ................ B33Y 10/00 |

FOREIGN PATENT DOCUMENTS

| | | |
|---|---|---|
| DE | 102009020987 A1 | 11/2010 |
| WO | 2015009444 A1 | 1/2015 |
| WO | 2015112998 A1 | 7/2015 |
| WO | 2016055523 A1 | 4/2016 |
| WO | 2016078800 A1 | 5/2016 |
| WO | 2019213154 A1 | 11/2019 |

* cited by examiner

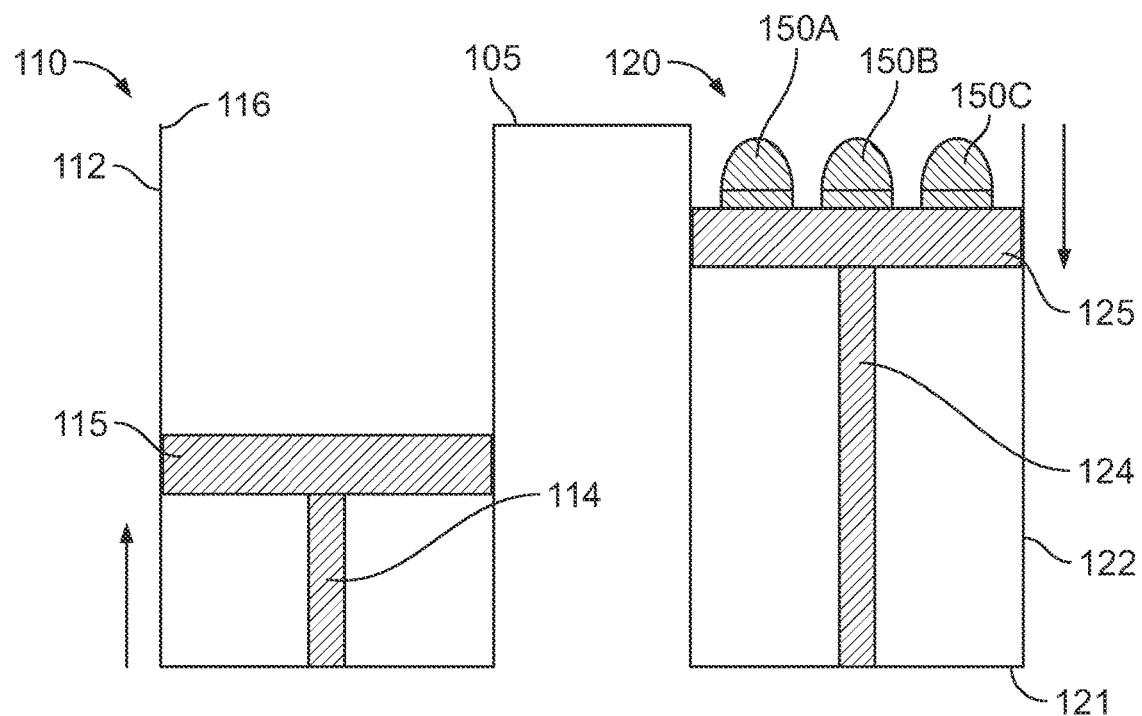
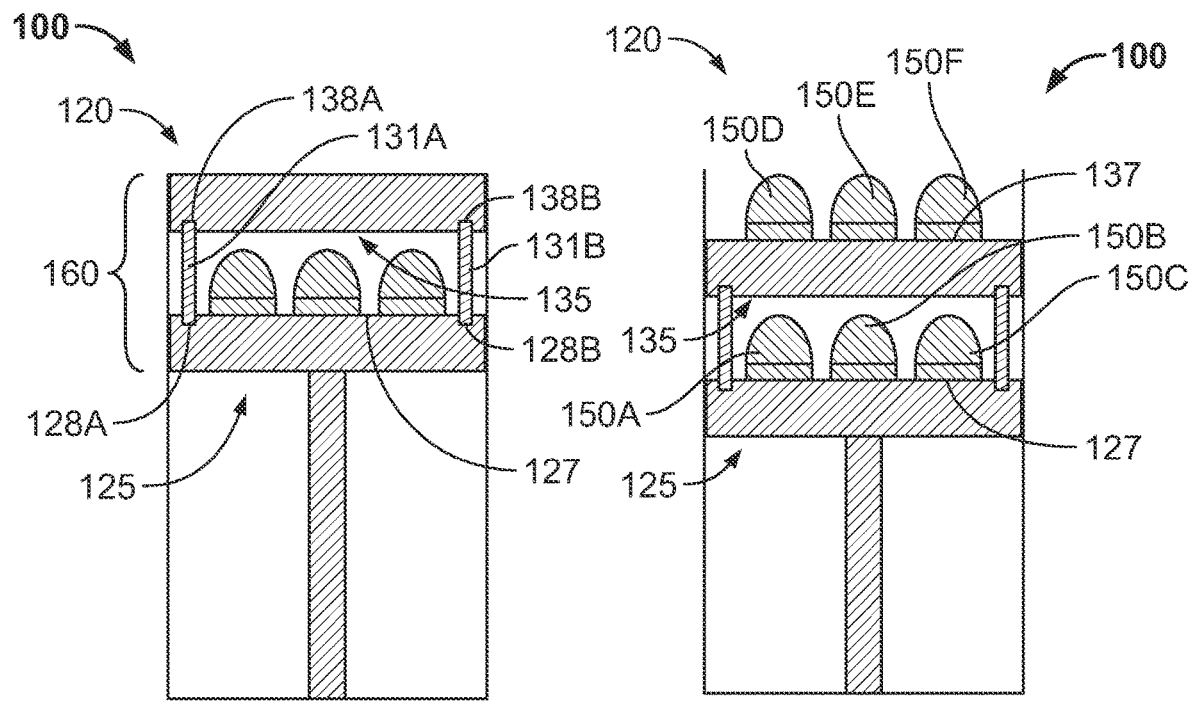
FIG. 1A
FIG. 1B   FIG. 1C

STACKABLE BUILD PLATES FOR ADDITIVE MANUFACTURING POWDER HANDLING

CROSS-REFERENCE TO RELATED APPLICATION

The present application claims the benefit of the filing date of U.S. Provisional Application No. 62/685,609 filed Jun. 15, 2018, the disclosure of which is hereby incorporated herein by reference.

FIELD OF THE INVENTION

The present application relates generally to the additive manufacturing equipment, and in particular relates to equipment and processes for minimizing powder handling.

BACKGROUND OF THE INVENTION

In the field of powder bed fusion or laser sintering, many additive manufacturing, i.e., three-dimensional (3D) printing, techniques require the use of powder which is sintered or melted by a high energy beam to form one or more desired objects on a build plate within a build area. The high energy beam is generally a laser beam and the formed objects are generally based on a computer-aided design (CAD) model. In fabricating such objects, unused powder, which is often either one or both of a metal powder and a ceramic powder, is left on the build plate and in the build area after complete fabrication and removal of the objects. Before additional objects can be fabricated the unused powder must be removed from the build plate and sieved, and the build area must be cleaned such that a predefined amount of powder can be replaced onto the build plate for sintering or melting by the high energy beam. Such cleaning requires that an operator access the build area to remove the used build plate and thus expose the build area to the atmosphere. As a result, the build area must be evacuated and filled with inert gases after the cleaning the build area.

Certain metal powders, such as titanium or titanium alloy powders often used in the additive manufacturing of medical devices, are highly flammable in oxygenated areas and thus require careful handling during removal from a build area. In today's additive manufacturing machines, powder handling of these volatile materials is often manually performed in an inert gas environment by a technician using special gloves which are accessed from outside the machine. As such, the removal of metal powder from a build plate and the cleaning of a build area of an additive manufacturing machine is known to take two hours or more which for production builds of relatively short duration can drastically affect the efficiency of the overall build process.

Therefore, there is a need to improve the process for handling powder during additive manufacturing of such powder.

BRIEF SUMMARY OF THE INVENTION

In accordance with an aspect, a 3D printing apparatus, which may be an additive manufacturing device, may include any 3D printing machine known to those skilled in the art which may include a dose chamber supplying powder and a build chamber having a build module that moves vertically within the build chamber to preset positions directed by a build file. The build chamber may define a base, which in some arrangements may include a bottom surface of the build chamber. The build module may include a first build plate, a plurality of supports, and a second build plate. The plurality of supports may be placed on, attached to, inserted into, or otherwise extended from the first build plate. The second build plate may be stackable onto the plurality of supports to space the second build plate from the first build plate.

In this manner, in some arrangements, one or more desired objects may be fabricated such as by additive manufacturing with a high energy beam on the first build plate, and then the plurality of supports may be extended from the first build plate and the second build plate stacked onto the plurality of supports prior to removing any one or any combination of the desired objects and unused powder from the first build plate. Additional desired objects may then be fabricated such as by additive manufacturing with a high energy beam on the second build plate. After fabrication of all of the desired objects on the first build plate and the second build plate, the desired objects and the unused powder on the first build plate and the second build plate may be removed and sieved for re-use of the powder.

Alternatively, in some arrangements, one or more desired objects may be fabricated such as by additive manufacturing with a high energy beam on the second build plate while the second build plate is stacked on the plurality of supports such that each of the supports extends between the first build plate and the second build plate. The second build plate and the supports may then be removed from the first build plate. Additional desired objects may then be fabricated on the first build plate such as by additive manufacturing with a high energy beam. After fabrication of all of the desired objects on the first build plate and the second build plate, the desired objects and the unused powder on the first build plate and the second build plate may be removed and sieved for re-use of the powder.

In some arrangements, the build module may be attached to one or more drive shafts that may be attached to the base. Any such drive shaft may be an extendable device that extends through or is attached to the bottom surface of the base defined by the build chamber. The position of any such drive shaft may be controlled by a processor to set the position of the build module, such as by way of hydraulics or a worm drive. In alternative arrangements, the build chamber may include magnetics that may be controlled to adjust the position of the build module within the build chamber.

In some arrangements, the build module may include additional build plates. In such arrangements, whether the build plates remain stacked together or are separated, all of the desired objects fabricated on all of the build plates of the build module and the unused powder on the first build plate may be removed, and the unused powder may be sieved, after such fabrication of all of the desired objects on all of the build plates of the build module.

In accordance with another aspect, a 3-D printing apparatus may include a base, a first build plate, and a second build plate. The base may include a build platform. The first build plate may be attached to the base and may be movable in vertical directions. The first build plate may be movable to a position spaced vertically from the build platform. The second build plate may be supported by the first build plate such that the second build plate may be spaced vertically from the first build plate.

In some arrangements, the 3D printing apparatus may include a shaft supported by the base and configured to move the first build plate in the vertical directions.

In some arrangements, the 3D printing apparatus may include a first support shaft that may extend between the first build plate and the second build plate. In some such arrangements, the second build plate may be removable from the first support shaft. In some arrangements, the second build plate may include a recess in which the first support shaft may extend into the recess. In some arrangements, the first support shaft may be a fastener having a shank and a head extending from the shank. In such arrangements, the head may be receivable in the recess such that the head is irremovable from a portion of the recess in a direction transverse to a plane defined by an opening into the recess. In some arrangements, the second build plate and the first support shaft may be threaded such that the first support shaft may be configured for threaded engagement to the second build plate. In some arrangements, the 3D printing apparatus may further include a fastener. In such arrangements, the fastener may be attached to the first support shaft through the second build plate to maintain the position of the second build plate relative to the first support shaft.

In some arrangements, the 3D printing apparatus may further include a third build plate supported by the second build plate. In this manner, the third build plate may be spaced vertically from the second build plate. In some such arrangements, the 3D printing apparatus may further include a second support shaft that may extend between the second build plate and the third build plate.

In some arrangements, the first support shaft may be attached to either one or both of a first side extending between a top and a bottom of the first build plate and a second side extending between a top and a bottom of the second build plate. In such arrangements, the top of the first build plate may face the bottom of the second build plate.

In accordance with another aspect, a plurality of objects may be fabricated by a process. In the process, a first object may be fabricated on a first build plate. The first build plate may be moved vertically. A second object may be fabricated on a second build plate supported by the first build plate. The second build plate may be located vertically relative to the first build plate.

In some arrangements, a first support shaft may be inserted into the first build plate.

In some arrangements, the second build plate may be stacked on, and in some such arrangements directly stacked and in contact with, the first build plate such that the second build plate is located vertically relative to the first build plate. In some such arrangements, the second build plate may be placed on a first support shaft attached to or inserted into the first build plate.

In some arrangements, the first object and the second object may be fabricated by a 3D printing process. In some such arrangements, 3D printing of the first object and the second object may include selectively heating portions of respective powder layers deposited on the first build plate to fabricate the first object and deposited on the second build plate to fabricate the second object. In some such arrangements, the powder layers may be made of any one or any combination of metal, ceramic, and plastic.

In some arrangements, a first support shaft may be 3D printed on the first build plate. In some such arrangements, a second build plate may be stacked on the first build plate such that the second build plate is located vertically relative to the first build plate. In some such arrangements, each of the first object and the first support shaft may be fabricated in layers in which each layer of the first object and each layer of the first support shaft may be fabricated simultaneously. In such arrangements, each layer of the first object and each corresponding layer of the first support shaft may be the same thickness. In such arrangements, each of the layers of the first object and each of the layers of the first support shaft may all be the same thickness.

In some arrangements, the first object may be removed from the first build plate prior to the fabrication of the second object on the second build plate. In some arrangements, the first build plate and the second build may be attached to each other. In such arrangements, the first build plate may be detached from the second build plate prior to the fabrication of the second object. In other such arrangements, the first build plate may be detached from the second build plate prior to the fabrication of the first object on the first build plate.

In some arrangements, the first build plate and the second build plate may be in contact with each other. In such arrangements, the first build plate and the second build plates may be separated after the step of fabricating the second object and before the step of fabricating the first object.

In accordance with another aspect, a plurality of objects may be fabricated by a process. In the process, portions of a first powder layer may be selectively heated on a first build plate to fabricate a first object on the first build plate. In the process, a second object may be fabricated on a second build plate stacked vertically with the first build plate without removing the first object from the first build plate.

In some arrangements, portions, which may be predetermined portions, of the first powder layer may be selectively heated on the first build plate during an additive manufacturing process. In some arrangements, the second object may be fabricated by selectively heating portions of a second powder layer on the second build plate. In some such arrangements, the second powder layer may be selectively heated on the second build plate during an additive manufacturing process.

In some arrangements, portions of the first powder layer remaining on the first build plate after selectively heating the first powder layer may be removed after fabricating the second object.

In some arrangements, a first support shaft may be 3D printed on the first build plate. In some such arrangements, a second build plate may be stacked on the first build plate such that the second build plate is located vertically relative to the first build plate. In some such arrangements, the first object and the first support shaft may each be fabricated in layers in which each layer of the first object and each layer of the first support shaft may be fabricated simultaneously. In such arrangements, each layer of the first object and each corresponding layer of the first support shaft may be the same thickness. In such arrangements, each of the layers of the first object and each of the layers of the first support shaft may all be the same thickness.

In accordance with another aspect, a plurality of objects may be fabricated by a process. In the process, a first object may be fabricated on a first build plate in a build chamber of an enclosed portion of an additive manufacturing machine. The first build plate may be removed from the build chamber to another region of the enclosed portion of the additive manufacturing machine. The first build plate may be replaced with a second build plate in the build chamber. A second object may be fabricated on the second build plate in the build chamber without opening the enclosed portion of the additive manufacturing machine.

In some arrangements, the process may be a 3D printing process. In some arrangements, the enclosed portion of the additive manufacturing machine may be sealed. In some arrangements, the enclosed portion of the additive manufacturing machine may be sufficiently sealed such that either one or both of inert gases do not escape from the enclosed portion of the additive manufacturing machine or ambient air does not enter the enclosed portion of the additive manufacturing machine.

In some arrangements, the first build plate may be placed on a surface within the enclosed portion of the additive manufacturing machine after being removed from the build chamber. In some arrangements, the first build plate may be placed on a hook or be suspended in some other manner within the enclosed portion of the additive manufacturing machine.

BRIEF DESCRIPTION OF THE DRAWINGS

A more complete appreciation of the subject matter of the present invention and various advantages thereof may be realized by reference to the following detailed description and the accompanying drawings, in which:

FIGS. 1A-1C are cross-sectional views of a build process in accordance with an embodiment;

DETAILED DESCRIPTION

Figure 2A:
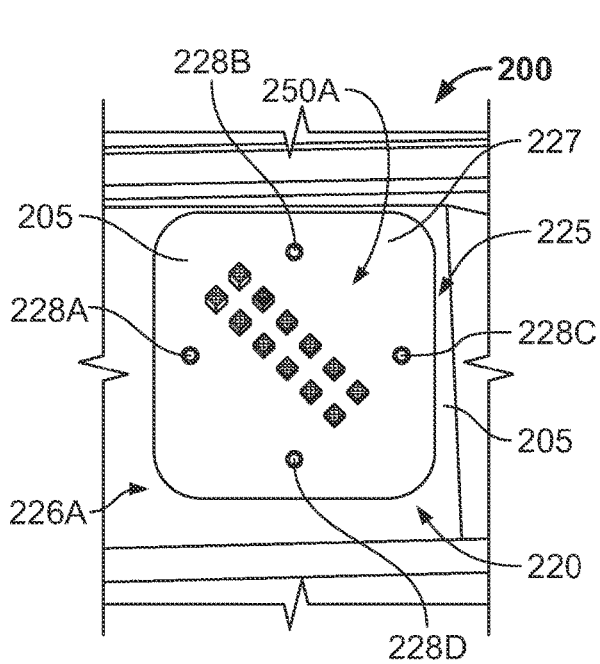
FIGS. 2A-2D are cross-sectional views of a build process in accordance with an embodiment.

Referring now to the drawings, as shown in FIGS. 1A-1C, additive manufacturing machine 100 includes, among other components known to those skilled in the art, dose chamber 110 and build chamber 120. Dose chamber 110 includes dose chamber wall 112, shaft 114, and dosing plate 115. Shaft 114 pushes, such as by hydraulics, magnetics, or gearing, dosing plate 115 upwardly along the chamber wall 112. In this manner, when dose chamber 110 is filled with powder, shaft 114 pushes the powder upwardly as the shaft moves upwardly a predefined distance. In this manner, the powder is positioned above opening 116 defined by and at an intersection of dose chamber wall 112 of dose chamber 110 and a build area surface 105 extending around and between the dose chamber and build chamber 120. The powder used in additive manufacturing machine 100 may be any one or any combination of metal powder, ceramic powder, and plastic powder. For example, the powder may be any one or any combination of titanium, a titanium alloy, stainless steel, magnesium, a magnesium alloy, cobalt, a cobalt alloy, a cobalt chrome alloy, nickel, a nickel alloy, tantalum, and niobium, polyethylene (PE) and variations thereof, polyetheretherketone (PEEK), polyetherketone (PEK), acrylonitrile butadiene styrene (ABS), silicone, and cross-linked polymers, bioabsorbable glass, ceramics, and biological active materials including collagen/cell matrices.

Build chamber 120 includes build platform 121 acting as a base, build chamber wall 122 extending from the build platform, drive shaft 124 attached to and extendable through the build platform, and first build plate 125 attached to an end of the drive shaft and positioned adjacent to the build chamber wall and thereby positioned proximate to the build chamber wall without any wall or other object between the first build plate and the build chamber wall. At the start of a build cycle using machine 100, first build plate 125 is held level with build area surface 105 by shaft 124. Shaft 124 applies, such as through the use of hydraulics, magnetics, or gearing, less force to first build plate 125 such that the build plate moves downwardly a distance corresponding to the distance that dosing plate 115 moves upwardly. Powder pushed above opening 116 of dose chamber 120 is transferred mechanically, such as by a roller, a brush, a rake, or other device configured to transfer and level the powder, onto first build plate 125 of build chamber 120. Powder deposited onto first build plate 125 is selectively heated, e.g., by sintering or melting using a high energy beam such as a laser beam, to form a first component layer of a set of desired objects 150A-150C, which may be substantially identical objects as shown, when first build plate 125 is level with build area surface 105 at the start of the build cycle. Successive powder layers transferred from dose chamber 120 and deposited onto first build plate 125 are selectively heated, e.g., by heating or melting as with the first layer, to form additional component layers of desired objects 150A-150C. In some alternative arrangements, only a single object or a plurality of different objects may be fabricated in this manner as desired. In one example, the set of desired objects 150A-150C may be medical implants such as acetabular cups.

As shown in FIG. 1B, upon completion of desired objects 150A-150C, first end portions of a plurality of supports 131A, 131B, which may be in the form of shafts as shown, are inserted into first build plate 125 of build chamber 120 at or, as shown, near sides of the build plate such that the first ends of the supports extend through build surface 127 of the first build plate. First build plate 125 may include recesses 128A, 128B, i.e., blind holes, as shown or holes through a thickness of first build plate 125 for receiving the respective plurality of supports 131A, 131B. Second ends opposite the first ends of the plurality of supports 131A, 131B are inserted into second build plate 135 such that the second build plate is spaced vertically without interruption along a length thereof from first build plate 125 to form build module 160. As shown and with reference to FIG. 1A, second build plate 135 is positioned adjacent to build chamber wall 122 and thereby positioned proximate to the build chamber wall without any wall or other object between the first build plate and the build chamber wall. As further shown, second build plate 135 may include a plurality of recesses 138A, 138B for receipt of respective ones of the second ends of the plurality of supports 131A, 131B. To facilitate the insertion of the ends of the plurality of supports 131A, 131B into respective first build plate 125 and second build plate 135, in some arrangements, the first built plate may be set at a position at or above build area surface 105 for attachment of the first ends of supports 131A, 131B to the first build plate, and the second ends of supports 131A, 131B may be set at a position at or above build area surface 105 for insertion of the second ends of supports 131A, 131B to the second build plate. Any number of supports, and corresponding recesses or holes when used, may be used with first build plate 125 so long as there is sufficient surface area for fabricating objects on the build plate. When inserting the plurality of supports 131A, 131B to first build plate 125, powder may need to be moved away or removed from recesses 128A, 128B and the area surrounding the recesses or from such other region being used to attach the supports to the first build plate in order to provide appropriate access to the first build plate such that an appropriate connection of the supports with the first build plate may be made.

As shown in FIG. 1C, a further set of desired objects 150D-150F, which may be substantially identical objects as shown, are fabricated on build surface 137 of second build plate 135 in the same manner that the plurality of desired objects 150A-150C are fabricated on build surface 127 of first build plate 125. After fabrication of the set of desired objects 150D-150F, both second build plate 135 and first build plate 125 of build module 160 and, in some arrangements, build area surface 105 may be fully cleaned, e.g., by removing all of the unused powder from the build module and in some arrangements build area surface 105 as well as sieving such removed powder. By delaying the full cleaning of first build plate 125 and, in some arrangements, build area surface 105 until after the fabrication of the plurality of desired objects 150D-150F on second build plate 135, production throughput of the plurality of desired objects 150A-150F may be increased.

Additional build plates may be attached to second build plate 135, such as by way of additional supports, as needed to form larger build modules (see FIG. 3A for example) such that additional sets of desired objects may be fabricated on the additional build plates. When additional build plates are to be utilized, as with adding second build plate 135 above first build plate 125, it may be necessary to move or remove powder from recesses and the area surrounding the recesses or from such other region of the build plate just used for a build in order to provide appropriate access to such build plate such that a connection of the supports to both the just used build plate and the plate to be used for the next build may be made. After fabrication of any additional set of desired objects on any such additional build plate, all of the build plates of the build module and, in some arrangements, build area surface 105 may be fully cleaned as described previously herein with respect to build module 160. By delaying the full cleaning of the build plates until after the fabrication of the plurality of desired objects on all of the build plates of the build module, production throughput of the plurality of desired objects may be further increased over the throughput achieved with build module 160.

In alternative arrangements, supports 131A, 131B may be fabricated by an additive manufacturing process on first build plate 125 along with the fabrication by the same process of the set of desired objects 150A-150C. In one example, layers of portions of each of supports 131A, 131B may be fabricated on first build plate along with layers of each of the set of desired objects 150A-150C such that the layers of the portions of the supports have the same thickness as the corresponding layers of the set of desired objects fabricated. Additional supports for supporting additional build plates, e.g., a third build plate, may be fabricated on further build plates, e.g., a second build plate, along with additional sets of desired objects, e.g., the set of desired objects 150D-150F, in the same manner as the fabrication of supports 131A, 131B on first build plate 125.

Figure 2B:
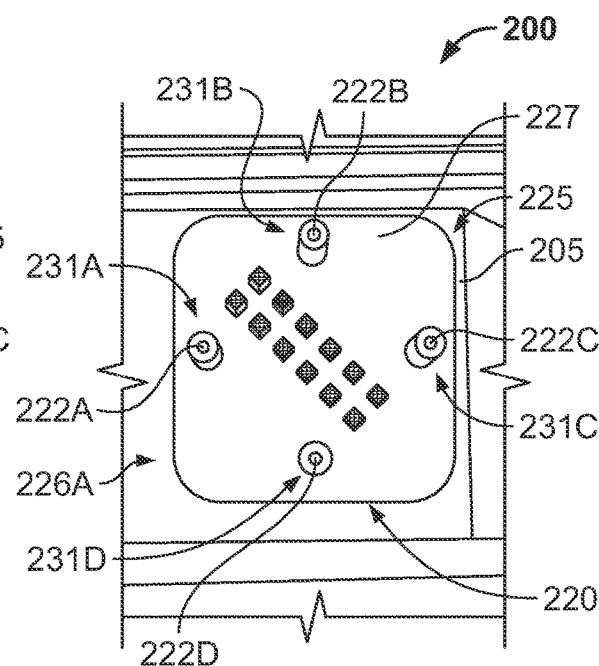
Figure 2C:
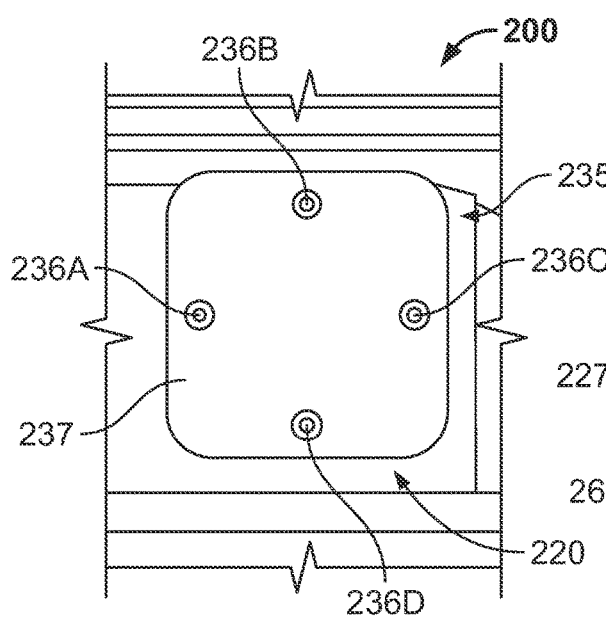
Figure 2D:
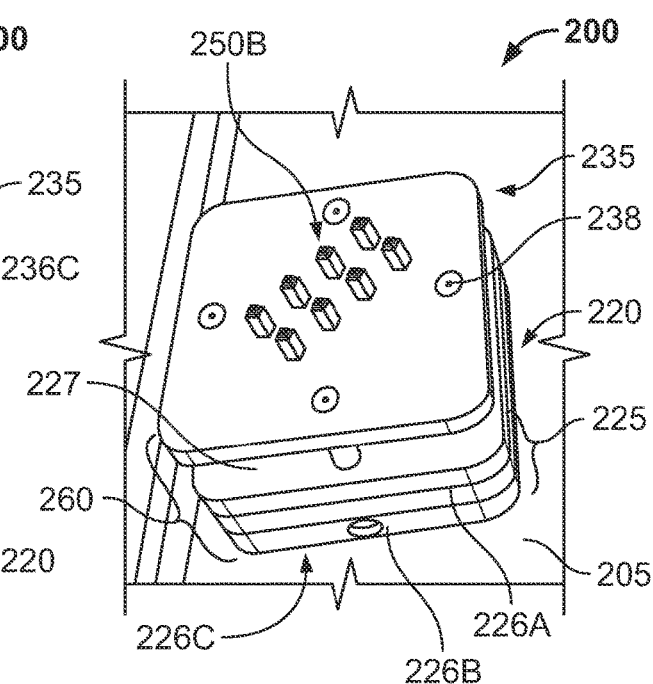

As shown in FIGS. 2A-2D, additive manufacturing machine 200 includes build chamber 220 that may be used in conjunction with a dose chamber, such as dose chamber 110. Build chamber 220 includes build module 260, best shown in FIG. 2D, attached to a drive shaft (not shown) that may be attached to and may be extendable through a build platform (not shown) or other base from which to extend. The drive shaft may be the same or substantially the same as drive shaft 124 of additive manufacturing machine 100. Referring to FIG. 2D, build module 260 includes first build plate assembly 225, second build plate 235, and a plurality of supports 231A-231D that space the first build plate from the second build plate as desired. As shown, first build plate assembly 225 may be a single plate, or as in the example shown, may be a combination of top plate 226A defining build surface 227, middle plate 226B in abutment with and supporting the top plate, and bottom plate 226C in abutment with and supporting the middle plate.

First build plate assembly 225 includes a plurality of cavities 228A-228D, which as shown may be four evenly spaced apart cavities extending into top plate 226A near each edge of build surface 227. In this manner, first end portions (not shown) of the plurality of supports 231A-231D may be inserted into the plurality of cavities 228A-228D such that a longitudinal axis defined by the supports extends orthogonally to build surface 227 of top plate 226A, e.g., in a vertical direction, as in the example shown in FIG. 2B. As in this example, the first end portions of the plurality of supports 231A-231D configured to be inserted into the plurality of cavities 228A-228D may have a perimeter that is smaller than at least corresponding middle portions of the plurality of supports, or as in the example shown smaller than the corresponding remainders of the plurality of supports, to define steps of the supports that rest on build surface 227 upon insertion of the supports into top plate 226A of first build plate assembly 225. With the first ends of the plurality of supports 231A-231D properly inserted into the plurality of cavities 228A-228D as shown in FIG. 2B, second build plate 235 may be placed onto second end portions opposite the first end portions of the plurality of supports 231A-231D such that the second build plate is supported by the plurality of supports and such that build surface 237 of the second build plate faces vertically upward, as shown in FIG. 2C. In some arrangements, second build plate 235 may include a plurality of recesses (not shown) in the same manner as second build plate 135 of additive manufacturing machine 100 for receipt of respective ones of the plurality of supports 231A-231D.

As further shown in FIG. 2C, second build plate 235 includes a plurality of holes 236A-236D, which as in the example shown may be four evenly spaced apart holes extending into the build plate near each edge of build surface 237. As shown, each of the plurality of holes 236A-236D may include lead-in chamfers. As shown in FIG. 2D, fasteners 238 may be inserted into holes 222A-222D extending into respective ones of the second end portions of the plurality of supports 231A-231D and through respective ones of the plurality of holes 236A-236D of second build plate 235 such that heads of the fasteners rest upon the lead-in chamfers of the holes of the second build plate and, as in the example shown, below build surface 237 of second build plate 235. Fasteners 238 may be any appropriate fastener, such as hex head screws as shown in FIG. 2D.

In use, additive manufacturing machine 200 operates in a substantially similar manner to additive manufacturing machine 100. Accordingly, first build plate assembly 225 attached to the drive shaft is moved vertically by the drive shaft such that build surface 227 of top plate 226A is substantially level with build area surface 205 (see FIGS. 2A and 2B) of additive manufacturing machine 200. With reference to FIG. 2A, a set of desired objects 250A is then fabricated on build surface 227 of first build assembly 225 in the same manner as the set of desired objects 150A-150C is fabricated on first build plate 125 using additive manufacturing machine 100 as described previously herein. With reference to FIGS. 2A and 2B, the first ends of the plurality of supports 231A-231D are then inserted into respective ones of the plurality of cavities 228A-228D extending into top plate 226A of first build plate assembly 225 such that the plurality of supports extend vertically. With reference to FIGS. 2B and 2C, second build plate 235 is then placed onto the plurality of supports 231A-231D such that build surface 237 of the second build plate faces vertically upward. Fasteners 238 are then inserted through respective ones of the plurality of holes 236A-236D, inserted into holes 222A-222D of the plurality of supports 231A-231D, and tightened against second build plate 235 such that second build plate is locked into position relative to first build plate assembly 225 and spaced vertically without interruption along a length thereof from the first build plate assembly a predefined distance, as desired, within build chamber 220. A set of desired objects 250B is then fabricated on build surface 237 of second build plate 235 in the same manner as the set of desired objects 150D-150F is fabricated on build surface 137 of second build plate 135 of build module 160 above. Complete cleaning of build module 250 and surrounding build area surface 205 may be delayed as in the same manner as the cleaning of build module 150 and build area surface 105.

Figure 3A:
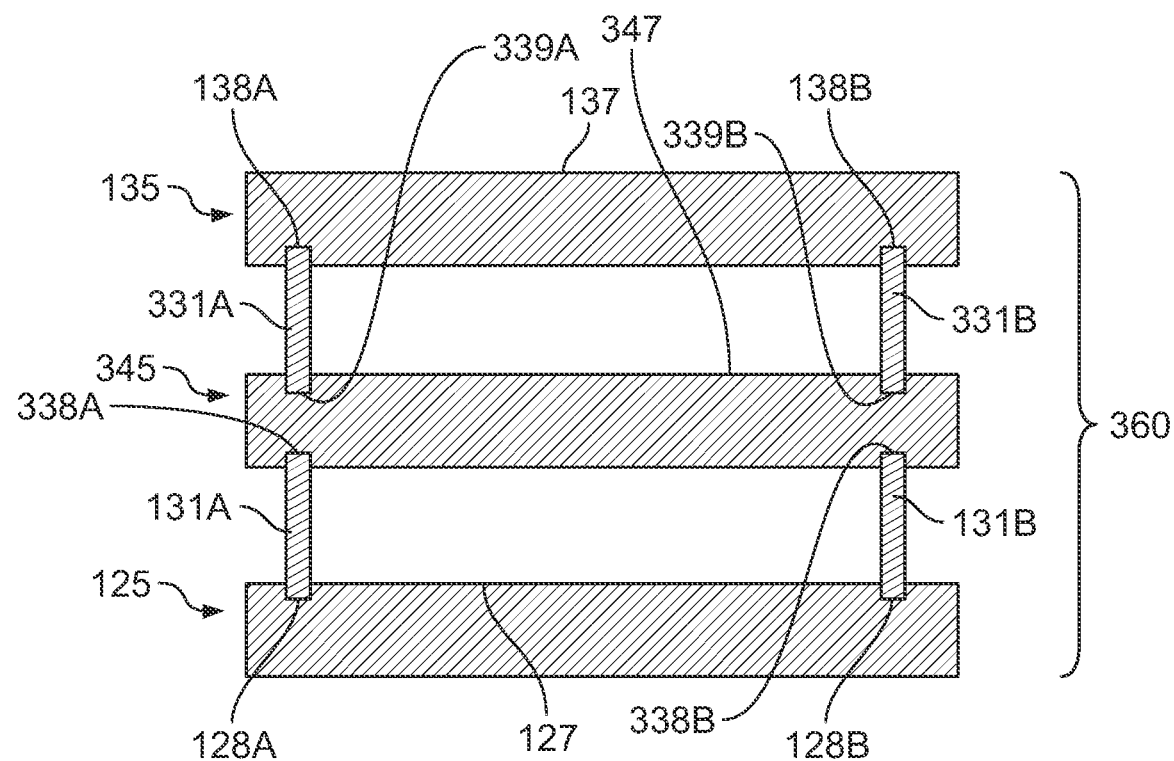
FIGS. 3A-3C are cross-sectional views of a build process in accordance with an embodiment.
Figure 3B:
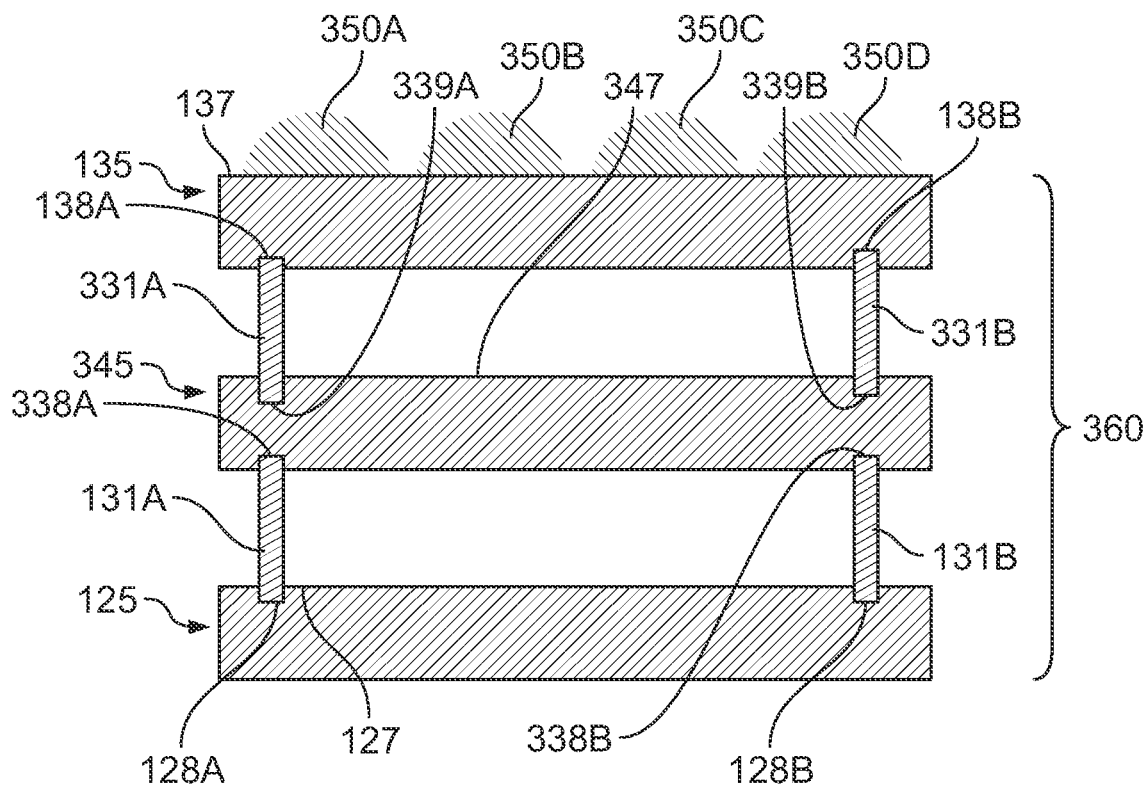
Figure 3C:
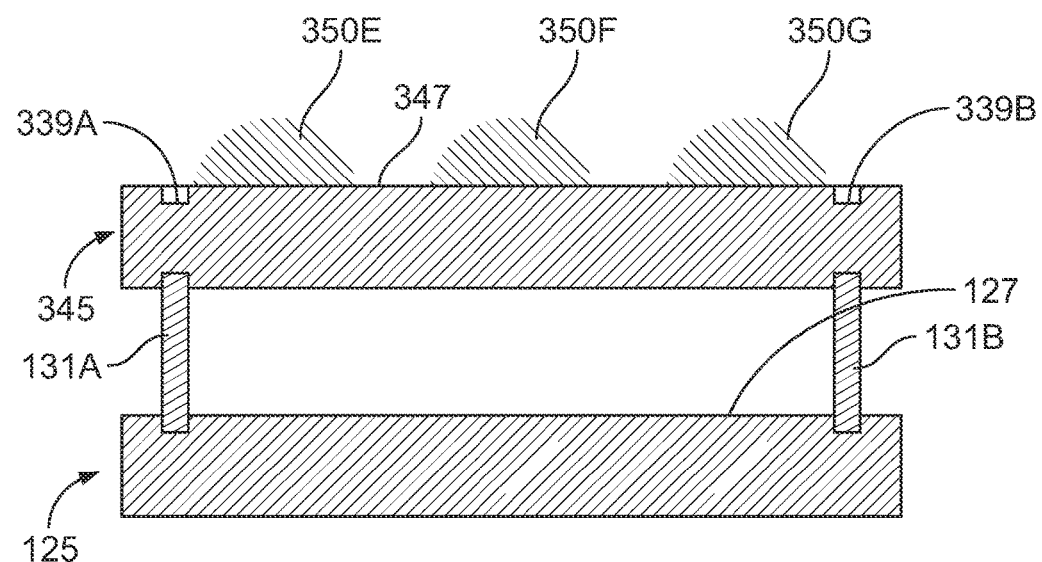

Referring now to FIGS. 3A-3C, build module 360 may be used in place of build modules 160 and 260 described previously herein. Build module 360, which may be preassembled away from the build chamber 220 or the additive manufacturing machine altogether, may be the same or substantially the same as build module 160 with the exception that build module 360 includes third build plate 345 configured for placement between first build plate 125 and second build plate 135 and further includes a plurality of supports 331A, 331B extending between the second build plate and the third build plate. Third build plate 345 is the same as or substantially the same as second build plate 135 with the exception that third build plate 345 includes bottom recesses 338A, 338B opposite top recesses 339A, 339B. As in the example shown, top recesses 339A, 339B may be the same as or substantially the same as recesses 128A, 128B of first build plate 125 and bottom recesses 338A, 338B may be the same as or substantially the same as recesses 138A, 138B of second build plate 135. In this manner, the plurality of supports 131A, 131B may be inserted into recesses 128A, 128B of first build plate 125 and into bottom recesses 338A, 338B of third build plate 345, respectively, such that the plurality of supports extends between first build plate 125 and third build plate 345 and such that the third build plate is spaced vertically without interruption along a length thereof from the first build plate. Further, the plurality of supports 331A, 331B may be inserted into top recesses 339A, 339B of third build plate 345 and into recesses 138A, 138B of second build plate 135, respectively, such that the plurality of supports extend between the third build plate and the second build plate and such that the second build plate is spaced vertically without interruption along a length thereof from the third build plate.

In use, build module 360 attached to the drive shaft at first build plate 125 is moved vertically by the drive shaft such that build surface 137 of second build plate 135 is substantially level with the build area surface, e.g., build area surface 105, of the additive manufacturing machine. With reference to FIGS. 3A and 3B, a set of desired objects 350A-350D is fabricated on build surface 137 of second build plate 135 in the same manner as the set of desired objects 150D-150F is fabricated on build surface 137 of second build plate 135 of build module 160 using additive manufacturing machine 100 as described previously herein. With reference to FIGS. 3B and 3C, build module 360 is moved upwardly in the build chamber, e.g., build chamber 120, such that the second build plate and the plurality of supports 331A, 331B are accessible to be removed, and the second build plate and the plurality of supports are then removed. The set of objects 350A-350D may be removed from second build plate 135 prior to removing the second build plate from build module 360, i.e., prior to separating the second build plate from third build plate 345, or in conjunction with the removal of the second build plate from the build module. Cleaning of second build plate 135 including sieving of unused powder, except to the extent unused powder needs to be removed to allow for removal of second build plate 135 and the plurality of supports 331A, 331B, may be performed after fabrication of objects on all of build plates 125, 135, 345 of build module 350. Such minimal cleaning of second build plate 135 and the plurality of supports 331A, 331B may be conducted without an operator of the additive manufacturing machine accessing the machine, e.g., by using gloves that attach to and are sealed against a surface of the additive manufacturing machine such that an operator can manipulate tools in the machine without physically entering the machine. After the removal of second build plate 135 and the plurality of supports 331A, 331B, the remainder of build module 360 is repositioned such that vertically facing build surface 347 of third build plate 345 is substantially level with the build area surface of the additive manufacturing machine.

Referring to FIG. 3C, a set of desired objects 350E-350G is fabricated on build surface 347 of third build plate 345 in the same manner as the set of desired objects 150D-150F is fabricated on build surface 137 of second build plate 135 of build module 160 using additive manufacturing machine 100 as described previously herein. After fabricating the set of desired objects 350E-350G, third build plate 345 and the plurality of supports 131A, 131B may be removed from the remainder of build module 360 in the same manner that second build plate 135 and the plurality of supports 331A, 331B are removed as described previously herein. A further set of desired objects (not shown) may then be fabricated on build surface 127 of first build plate 125 in the same manner that the set of desired objects 350A-350D are fabricated on build surface 137 of second build plate 135 and the set of desired objects 350E-350G are fabricated on build surface 347 of build plate 345. After fabrication of the sets of desired objects on all of build plates 125, 135, 345, each of the now separated build plates 125, 135, 345, and in some arrangements, the surrounding build area surface, may be cleaned, including through the removal of unused powder, as described previously herein.

In alternative arrangements, an additional build plate or additional build plates may be attached to second build plate 135, such as by way of additional supports, as needed to form larger build modules such that additional sets of desired objects may be fabricated on the additional build plates. In some such arrangements, there may be a total of four, five, six, or more build plates stacked together vertically. When additional build plates are to be utilized, as with removing second build plate 135 from third build plate 345, it may be necessary to move or remove powder from recesses and the area surrounding the recesses or from such other region of the build plate just used for a build in order to provide appropriate access to such build plate for the removal of the build plate. After fabrication of the sets of desired objects on all of build plates 125, 135, 345, and the additional build plate or build plates, each of the now separated build plates, and in some arrangements, the surrounding build area surface, may be cleaned, including through the removal of unused powder, as described previously herein.

In alternative arrangements to that shown and described in FIGS. 3A-3C, a build module may not include any supports or any fasteners for fixing such supports to build plates. In such arrangements, the build module may include build plates in which some, and preferably all, of the build plates that do not need to attach to shaft 124, or other component that raises and lowers the build module, may have surfaces that allow the plates to be stacked directly onto another of the plates. In this manner, a greater number of build plates may be inserted into a build chamber, such as build chamber 120, than are inserted into existing additive manufacturing machines and even more than may be used with build modules in the form of build module 360 for a given build chamber. Like the build modules described previously herein, the build modules without supports may be retrofitting to existing additive manufacturing machines as well as used with new machines.

Without the need for attachment of build plates using supports, there is also no need for any attachment holes or recesses to attach or to receive such holes or recesses, as appropriate. As such, more desired objects may be fabricated for a given perimeter of a build plate having such holes or recesses.

In some such arrangements, at least some, and preferably all, of the build plates stacked onto other plates may include poke-a-yoke features, e.g., bosses on either one or both of a higher plate and a lower plate that allow the higher plate to be stacked onto the lower plate such that either one or both of the higher plate and the lower plate do not either one or both of move laterally (i.e., in a direction transverse to a longitudinal axis defined by the build chamber and thus in a direction of movement of shaft 124 for example) or rotate when the higher plate is stacked onto the lower plate. In some other such arrangements, at least some, and preferably all, of the build plates stacked onto other plates may include flat surfaces without any poke-a-yoke features. In some other such arrangements, at least some, and preferably all, of the build plates stacked onto other plates may include holes or more preferably recesses to receive one or more dowel pins such that a higher build plate may be stacked directly onto a lower plate such that the pair of build plates are prevented from moving laterally relative to each other, and where more than one dowel pin is used, such that the pair of build plates are prevented from rotating relative to each other.

Figure 4A:
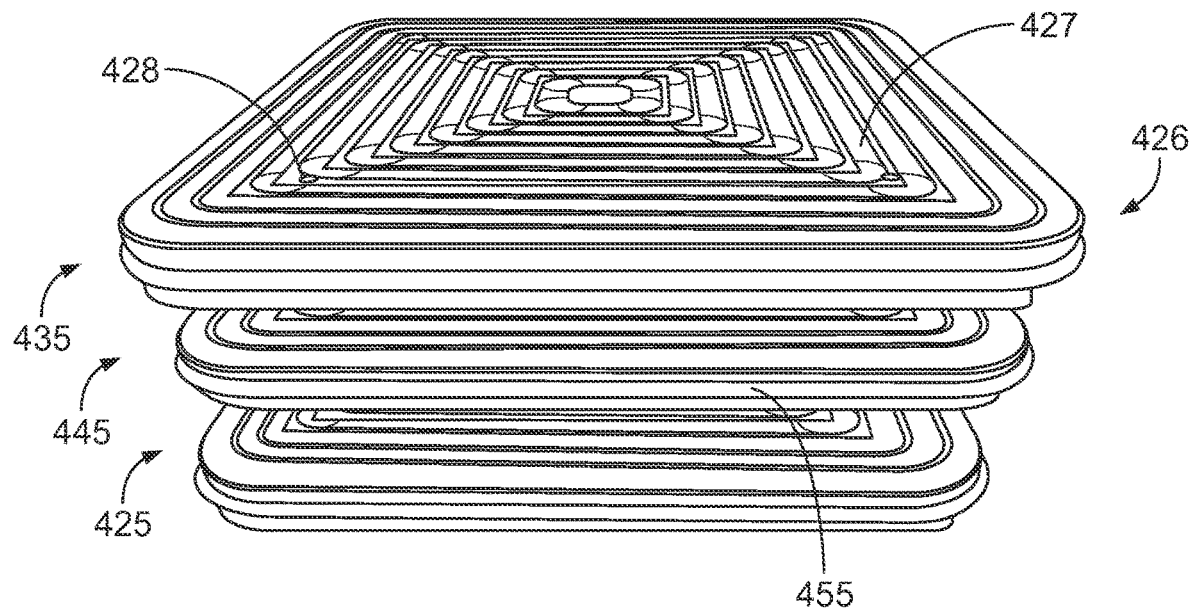
FIG. 4A is a perspective view of a set of build plates in accordance with an embodiment.
Figure 4B:
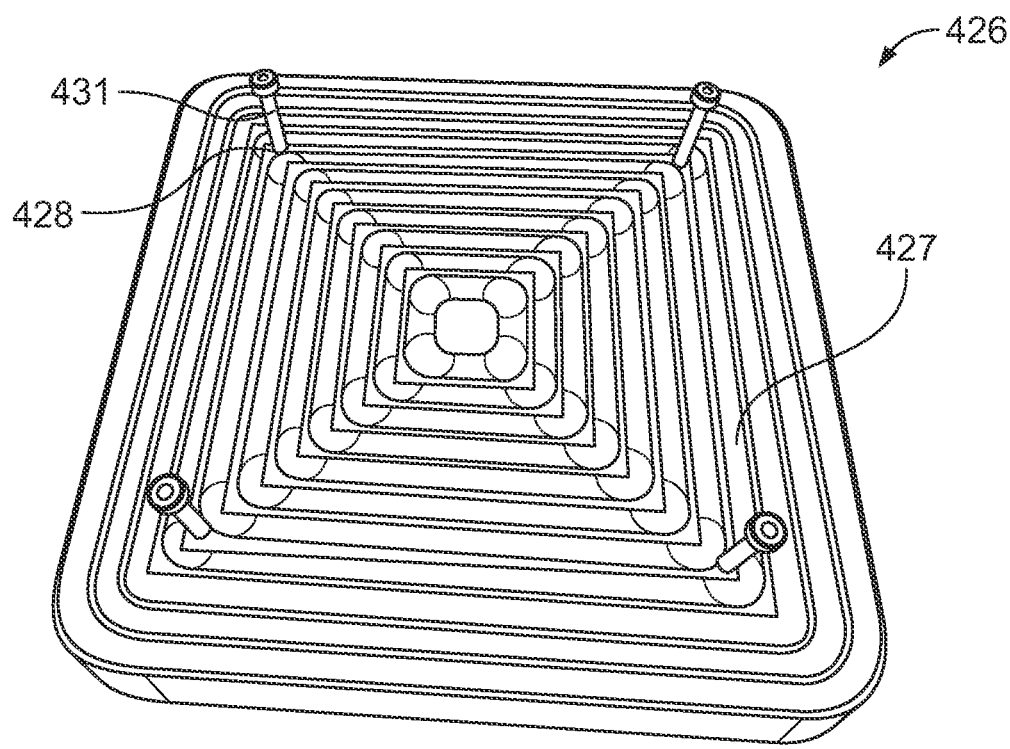
FIG. 4B is a perspective view of a top of a build plate of the set of build plates shown in FIG. 4A.
Figure 4C:
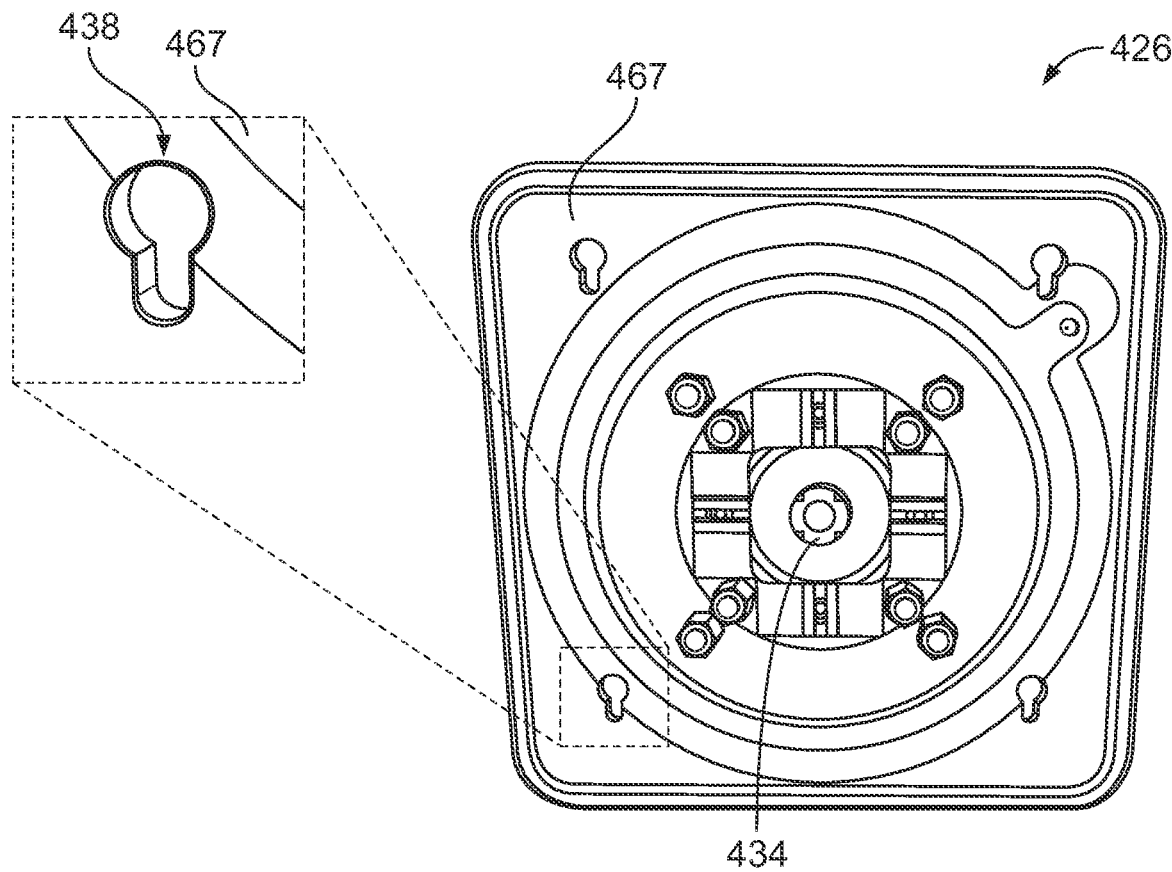
FIG. 4C is a plan view of a bottom of a build plate of the set of build plates shown in FIG. 4A.

Referring now to FIGS. 4A-4C, in an alternative arrangement to build chamber 120, build plates 125, 135 may be replaced by a set of build plate assemblies 425, 435, 445. Plate assemblies 425, 435, 445 each include build plate 426 and optionally seal 455 and one or more supports 431. As in the example shown, each seal 455 may be inserted into a groove within its respective build plate 426 such that when build plate assemblies 425, 435, 445 are inserted within build chamber 120, each of the seals prevents or at least inhibits powder placed on top surface 427 of build plate 426 from falling through a gap between the corresponding build plate and chamber wall 122 of build chamber 120. As shown in FIG. 4B, top surface 427 is a flat surface, which as in the example shown, may be machined. Top surface 427 includes recesses or holes 428 configured, such as by being threaded, to receive support 431, which as in the example shown may be a threaded fastener.

With reference to both FIG. 4B and FIG. 4C, each support 431 may be received into a corresponding slot 438 defined by bottom surface 467 of each build plate 426. In the example shown, slot 438 has a wider end and a narrow end. The wider end is configured for receiving a head of support 431 into the wider end (and thus into the slot) in a direction transverse to a plane defined by the opening into slot 438. The narrow end of slot 438 is configured for receiving the head of the support following its insertion into the wider end of the slot such that once the head of the support is received in the narrow end, the head of the support is prevented from being removed through the portion of the opening of the slot defined by the narrow end. In this manner, slot 438 acts as a keyway. Build plate 426 further includes shaft hole 434 configured for receipt of a drive shaft such as shaft 124. In this manner, build plate 426 may act as a lowest build plate when attached to the drive shaft or act as an intermediate or uppermost build plate when one or more supports 431, four such supports in the example of FIGS. 4A-4C, are attached to a lower adjacent build plate 426 by way of receipt of the supports of the lower adjacent build plate into slot 438 of the intermediate or uppermost build plate.

In some arrangements, an additive manufacturing machine may include a robot either outside or preferably inside the machine in which the robot is configured to manipulate plates to remove a build plate upon fabrication of a set of desired objects on such build plate, both with and without the desired objects on such build plate, and to replace such plate with another build plate for fabrication of an additional set of desired objects. In some such arrangements, such robot may grab or otherwise lift build plates or may slide or otherwise translate such build plates as necessary to replace one plate with another plate for the fabrication of multiple sets of desired objects without the need for an operator to access an additive manufacturing machine, e.g., to clean build plates. In some such arrangements, the robot may be configured to grab or otherwise move desired objects that have been fabricated.

In alternative arrangements to any of the arrangements discussed previously herein, an additive manufacturing machine may configured to store either one or both of used build plates upon which objects have been fabrication that require cleaning and clean build plates upon which objects may be fabricated. A storage device for such storage may be included within an interior of the additive manufacturing machine such that the used build plates may be stored in the storage device and the clean build plates may be removed from the storage device without needing an operator to access the interior of the additive manufacturing machine. Instead, the used and the clean build plates may be accessed, such as by an operator using gloves attached to the machine as described previously herein or by a robot, without exposing the interior of the additive manufacturing to the atmosphere on the exterior, maintaining the inert gases in the interior of the machine. The storage device may be a shelf, a bin, or other suitable devices for storing the build plates when such plates are not in use.

In some arrangements, the build plates themselves, which may be but are not limited to being in the form of any one of build plates 125, 135, 235, 345, 425, 435, 445, may be fabricated by additive manufacturing.

It is to be understood that the disclosure set forth herein includes all possible combinations of the particular features set forth above, whether specifically disclosed herein or not. For example, where a particular feature is disclosed in the context of a particular aspect, arrangement, configuration, or embodiment, that feature can also be used, to the extent possible, in combination with and/or in the context of other particular aspects, arrangements, configurations, and embodiments of the invention, and in the invention generally.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A three-dimensional (3-D) printing apparatus comprising:
a base including a build platform and a build chamber wall extending vertically from the build platform to define a build chamber;
a first build plate device comprising a first build plate attached to the base and movable in the build chamber in vertical directions to a position spaced vertically from a plane defined by the build platform;
a first support shaft; and
a second build plate device comprising a second build plate movable in the build chamber and supported by the first build plate via the first support shaft such that an entirety of the second build plate is spaced vertically from the first build plate, the first build plate and the second plate thereby being configured to simultaneously support fabricated objects via contact with the fabricated objects,
wherein the first build plate device and the second build plate device are in abutment with the build chamber wall.

2. The apparatus of claim 1, further comprising a shaft supported by the base and configured to move the first build plate in the vertical directions.

3. The apparatus of claim 1, wherein the first support shaft extends between the first build plate and the second build plate.

4. The apparatus of claim 3, wherein the second build plate is removable from the first support shaft.

5. The apparatus of claim 4, wherein the second build plate includes a recess, and wherein the first support shaft extends into the recess.

6. The apparatus of claim 5, wherein the first support shaft is a fastener having a shank and a head extending from the shank, and wherein the head is receivable in the recess such that the head is irremovable from a portion of the recess in a direction transverse to a plane defined by an opening into the recess.

7. The apparatus of claim 3, wherein the second build plate and the first support shaft are threaded such that the first support shaft is configured for threaded engagement to the second build plate.

8. The apparatus of claim 3, further comprising a fastener, wherein the fastener attaches to the first support shaft through the second build plate to maintain the position of the second build plate relative to the first support shaft.

9. The apparatus of claim 3, further comprising a third build plate supported by the second build plate such that the third build plate is spaced vertically from the second build plate.

10. The apparatus of claim 3, wherein the first support shaft attaches to either one or both of a first side extending between a top and a bottom of the first build plate and a second side extending between a top and a bottom of the second build plate, the top of the first build plate facing the bottom of the second build plate.

11. A three-dimensional (3-D) printing system configured for providing a high energy beam for selectively heating metal powder deposited onto build plates within the system, the system comprising:
a base including a build platform and a build chamber wall extending vertically from the build platform to define a build chamber;
a first build plate attached to the base and movable in the build chamber in vertical directions to a position spaced vertically from a plane defined by the build platform;
a second build plate movable in the build chamber and supported by the first build plate;
a first set of fabricated objects supported by the first build plate;
a second set of fabricated objects supported by the second build plate;
a remaining portion of metal powder supported by either one or both of the first build plate and the second build plate remaining after selectively heating, with the high energy beam, a portion of the metal powder to form a respective one or ones of the first set of fabricated objects and the second set of fabricated objects supported by the one or both of the first build plate and the second build plate, wherein the first build plate and the second build plate are adjacent to the build chamber wall.

12. The system of claim 11, wherein the remaining portion of the metal powder is supported by both the first build plate and the second build plate.

13. A three-dimensional (3-D) printing apparatus comprising:
a base including a build platform and a build chamber wall extending vertically from the build platform to define a build chamber;
a first build plate device comprising a first build plate attached to the base and movable in the build chamber in vertical directions to a position spaced vertically from a plane defined by the build platform;
a first support shaft; and
a second build plate device comprising a second build plate movable in the build chamber and supported by the first build plate via the first support shaft such that a portion of the second build plate is spaced vertically without interruption from the first build plate, the first build plate and the second build plate thereby being configured to simultaneously support fabricated objects via contact with the fabricated objects,
wherein the first build plate device and the second build plate device are in abutment with the build chamber wall.

14. The apparatus of claim 13, further comprising a shaft supported by the base and configured to move the first build plate in the vertical directions.

15. The apparatus of claim 13, wherein the first support shaft extends between the first build plate and the second build plate.

16. The apparatus of claim 15, wherein the second build plate is removable from the first support shaft.

17. The apparatus of claim 16, wherein the second build plate includes a recess, and wherein the first support shaft extends into the recess.

18. The apparatus of claim 15, wherein the second build plate and the first support shaft are threaded such that the first support shaft is configured for threaded engagement to the second build plate.

19. The apparatus of claim 15, further comprising a fastener, wherein the fastener attaches to the first support shaft through the second build plate to maintain the position of the second build plate relative to the first support shaft.

20. The apparatus of claim 15, further comprising a third build plate supported by the second build plate such that the third build plate is spaced vertically from the second build plate.

21. The apparatus of claim 1, wherein the first build plate device and the second build plate device each include a seal positioned within respective gaps between the first build plate and the build chamber wall and between the second build plate and the build chamber wall to at least inhibit powder within the 3-D printing apparatus from falling through the respective gaps.

22. The apparatus of claim 11, further comprising:
- a first seal attached to the first build plate and positioned within a first gap between the first build plate and the build chamber wall to at least inhibit any of the metal powder supported by the first build plate from falling through the first gap; and
- a second seal attached to the second build plate and positioned within a second gap between the second build plate and the build chamber wall to at least inhibit any of the metal powder supported by the second build plate from falling through the second gap.

* * * * *